(12) United States Patent
Sakai et al.

(10) Patent No.: US 8,406,100 B2
(45) Date of Patent: Mar. 26, 2013

(54) OPTICAL DISC DEVICE AND TRACKING SERVO CONTROL CIRCUIT THEREFOR

(75) Inventors: Hiroharu Sakai, Tokyo (JP); Koji Kaniwa, Yokohama (JP); Hajime Nishimura, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 0 days.

(21) Appl. No.: 13/030,281

(22) Filed: Feb. 18, 2011

(65) Prior Publication Data

US 2011/0216638 A1    Sep. 8, 2011

(30) Foreign Application Priority Data

Mar. 5, 2010  (JP) ................................ 2010-048996

(51) Int. Cl.
*G11B 7/09* (2006.01)

(52) U.S. Cl. .............. 369/44.27; 369/47.5; 369/44.11; 369/44.28; 369/53.23; 369/53.43

(58) Field of Classification Search .............. 369/30.15, 369/30.21, 30.22, 30.24, 30.29, 30.36, 44.25, 369/44.27, 44.28, 44.29, 44.32, 44.35, 47.5, 369/53.19, 53.23, 53.28, 53.35, 53.42, 53.43, 369/53.45

See application file for complete search history.

(56) References Cited

U.S. PATENT DOCUMENTS

| | | | |
|---|---|---|---|
| 4,773,052 A * | 9/1988 | Sugiura et al. | 369/2 |
| 2003/0147314 A1* | 8/2003 | Kondo et al. | 369/44.32 |
| 2009/0097366 A1* | 4/2009 | Yamamuro | 369/44.32 |

FOREIGN PATENT DOCUMENTS

JP    09-007200    1/1997

* cited by examiner

*Primary Examiner* — Wayne Young
*Assistant Examiner* — Dionne Pendleton
(74) *Attorney, Agent, or Firm* — Antonelli, Terry, Stout & Kraus, LLP.

(57) ABSTRACT

In an optical disc device, a way of canceling a lens shift due to an electric offset of an output of a tracking actuator driving circuit is desired. A tracking servo control circuit contains a first operation mode for setting an output current of the tracking actuator driving circuit to generally zero and a second operation mode for supplying a predetermined potential to the input. An average potential of a push-pull signal detected in the first operation mode is acquired. An object lens is moved by a predetermined amount in both radial directions by changing a potential supplied in the second mode to acquire correlative relationship between average potential of a push-pull signal relative to a lens movement amount and the supplied potential. An offset amount is acquired from the potential and the correlative relationship to cancel the offset.

3 Claims, 5 Drawing Sheets

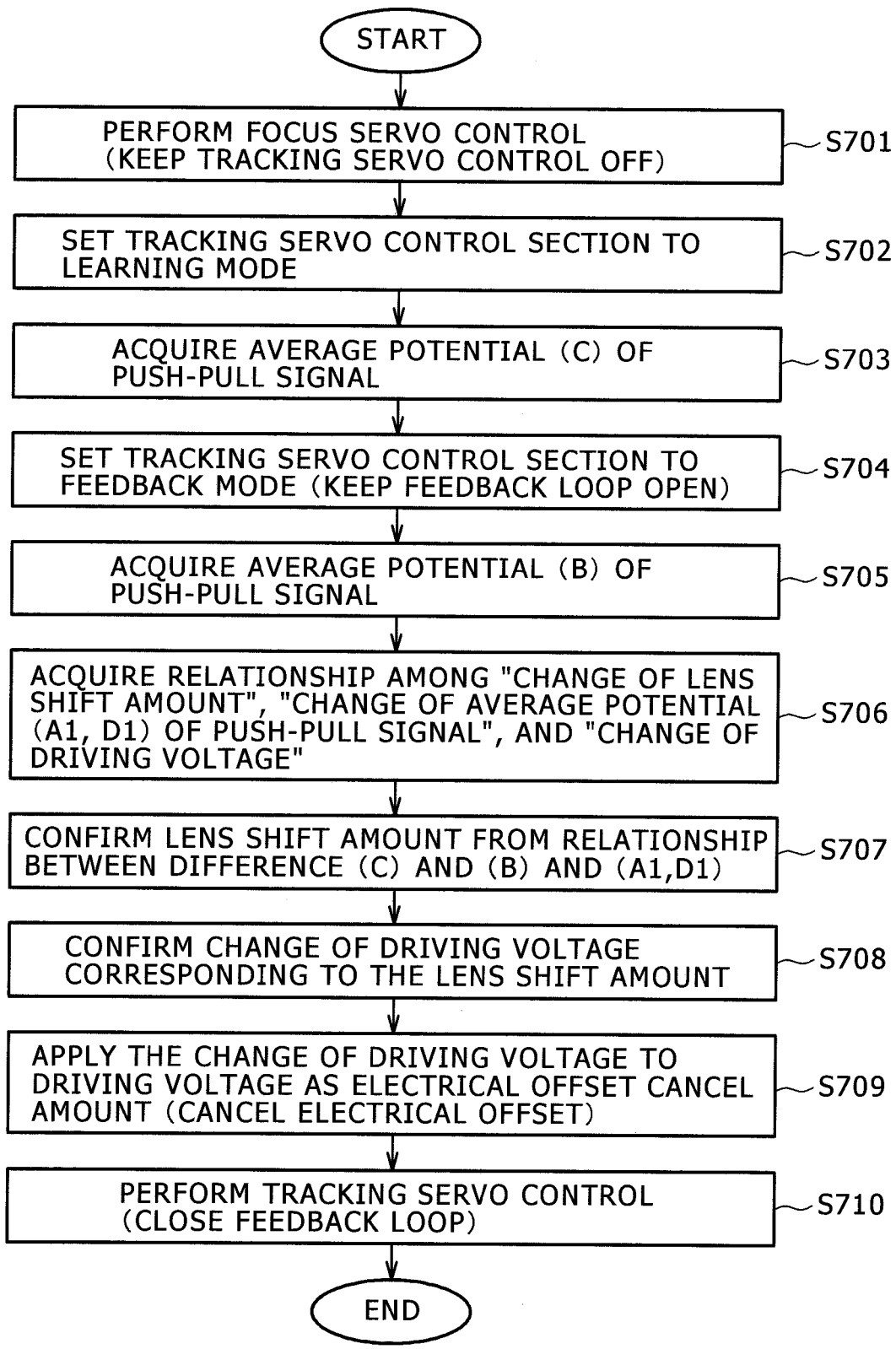

OPTICAL DISC DEVICE AND TRACKING SERVO CONTROL CIRCUIT THEREFOR

INCORPORATION BY REFERENCE

This application relates to and claims priority from Japanese Patent Application No. 2010-048996 filed on Mar. 5, 2010, the entire disclosure of which is incorporated herein by reference.

BACKGROUND OF THE INVENTION (1) Field of the Invention

The present invention relates to an optical disc device and a tracking servo control circuit for the optical disc device and particularly to an optical disc device having an improved tracking servo control and a tracking servo control circuit for the optical disc device.

(2) Description of the Related Art

In the field of optical disc devices, densification of recording is developing as recording mediums evolve in the order of CDs (compact Discs), DVDs (Digital Versatile Discs), and BDs (Blu-ray Discs). A pitch of a track of discs for data recording is narrowing. For example, a pitch of a CD is 1.6 µm, a pitch of a DVD-R (Recordable) is 0.74 µm, and a pitch of a BD-R is 0.32 µm. Therefore, a tracking servo control may require higher accuracy to reproduce signals from an optical disc.

Japanese Patent Application Laid-Open No. H9 (1997)-7200 discloses a technique in which an offset is detected from an envelope of signal components of a light receiving element having a radially divided light receiving surface to compensate for a signal level of a push-pull signal.

SUMMARY OF THE INVENTION

In optical disc devices, a tracking servo control is performed using a push-pull signal. This push-pull signal is, for example, a periodical sine signal, whose positive and negative amplitudes may differ due to, e.g., a shape of a reflecting surface of an optical disc. Asymmetry of an electrical circuit driving an optical pickup irradiating a laser light and receiving a reflected light may cause an offset of the center of amplitude of a push-pull signal. These factors cause a tracking offset and accordingly a track is traced with an optical spot of a laser light being offset from the center of a recording track. The offset of the optical spot makes an error rate worse or causes off-tracking easily due to impacts, for example.

In recent optical disc devices, as described above, an accurate tracking servo control capability and lower current consumption may be required. A lens shift amount per a driving current for fine tuning a position of an object lens of an optical pickup in a radial direction of the optical disc, in other words, a DC sensitivity of a tracking actuator is increased.

An electrical offset of, e.g., about several ten mA is often generated in an output of a driver circuit for driving the tracking actuator. In other words, even when a driving output is designed to be zero mA correspondingly to an optimum current tracking position, the electrical offset of several ten mA is actually supplied to the tracking actuator in response to an optimum tracking position. On the other hand, on the premise that an offset current is zero mA, the tracking servo circuit controls the tracking actuator to track a position in which a driving output is zero mA. For this reason, while the lens has shifted in the inner or outer peripheral side by the offset current, the tracking servo control is performed. Disadvantageously, due to an optical positional shift by a lens shift, an average potential of a push-pull signal is also offset to trace a position shifted from an optimum position by tracking.

Additionally, a shift from an optimum position in the tracking center due to an offset current disadvantageously becomes larger as the DC sensitivity of an actuator becomes high as described above.

An offset current of several tens mA generated even when the driving current is designed to be zero mA narrows an actuator driving current range permissible by a rated current by the offset current. For this reason, it is necessary that an actuator driving range is designed to be narrowed by an estimated offset current. Accordingly, there is also a problem that it is difficult for the actuator to drive by use of a movable range permissible by a rated current of the actuator itself.

Therefore, it is desirable to provide an optical disc device having an improved tracking servo control capability and a tracking servo control circuit for the optical disc device.

For solving the above problem, the present invention provides an optical disc device using an optical disc as a recording medium to record and reproduce an information signal by irradiating a laser light onto the recording medium. The optical disc device includes: an optical pickup having a laser light source generating the laser light, an object lens which collects the laser light generated by the laser light source and through which the laser light is irradiated onto the optical disc, and a tracking actuator for tuning a relative radial position of the object lens relative to the optical disc, the optical pickup recording an information signal onto a recording track of the optical disc or reproducing an information signal recorded on the optical disc; a tracking servo control section for controlling a relative radial position of the object lens relative to the optical disc by driving the tracking actuator based on information about a relative radial position of the object lens relative to the optical disc; and an overall control section for controlling operations of the optical disc device. The tracking servo control section includes: a first operation mode for setting a driving power supplied to the tracking actuator to generally zero; a second operation mode for supplying a predetermined driving power to the tracking actuator in response to a predetermined input potential supplied to the tracking servo control section based on a control from the overall control section; and a third operation mode for supplying a driving power to the tracking actuator based on information about a relative radial position of the object lens relative to the optical disc, the information being supplied to the tracking servo control section. The overall control section, when the optical disc is installed to the optical disc device, sets the tracking servo control section to the first operation mode to acquire information about a relative radial position of the object lens relative to the optical disc, sets the tracking servo control section to the second operation mode in which a driving power changing an input potential supplied to the tracking servo control by a predetermined amount by which the object lens moves in both radial directions of the optical disc is set to be supplied to the tracking actuator to acquire relationship between the input potential and information about a relative radial direction of the object lens relative to the optical disc, and shifts the input potential supplied to the tracking servo control section based on the information about the relative position in the first operation mode and the relationship in the second mode to set the tracking servo control section to the third operation mode in which a tracking servo control for the optical control is performed.

The present invention also provides a tracking servo control circuit for an optical disc device using an optical disc as a recording medium to record and reproduce an information signal by use of an optical pickup, the tracking servo control circuit causing the optical pickup to trace a recording track of the information signal. The tracking servo control circuit includes a tracking driving section that receives a signal showing information about a relative radial position of the optical pickup relative to the optical disc, generates a driving power based on the signal and supplying the driving power to the optical pickup, and controls a relative radial position of the optical pickup relative to the optical disc. The tracking driving section includes an operation mode for setting the driving power for the optical pickup to generally zero.

According to the present invention, an optical disc device having an improved tracking control capability and a tracking servo control circuit for the optical disc device can be provided, advantageously contributing to improvement of the basic performance of the optical disc device.

BRIEF DESCRIPTION OF THE DRAWINGS

These and other features, objects and advantages of the present invention will become more apparent from the following description when taken in conjunction with the accompanying figures wherein:

FIG. 7 is a flowchart of offset cancellation in one embodiment of the present invention.

DETAILED DESCRIPTION OF THE EMBODIMENT

Hereafter, embodiments of the present invention are explained using the accompanying figures.

Figure 1:
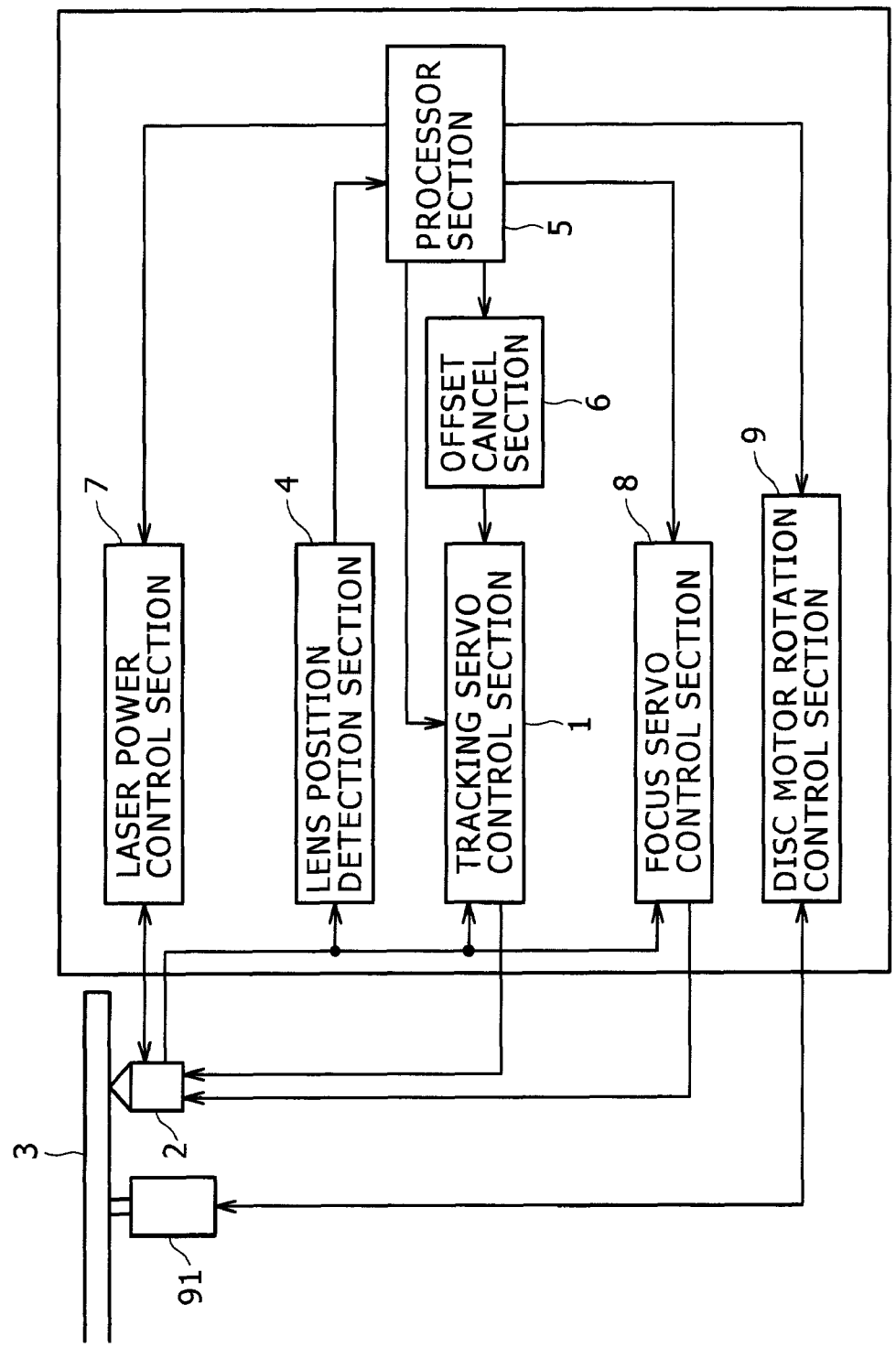
FIG. 1 is a block diagram of a control system of an optical disc device in one embodiment of the present invention.

FIG. 1 is a block diagram of a control system of an optical disc device in one embodiment of the present invention. When an optical disc 3 is installed in the optical disc device, a disc motor rotation section 9 controls a disc motor 91 in response to instructions from a processor section 5 to rotate the optical disc 3 at a predetermined rate. The processor section 5 presides at least the overall servo control system of the optical disc device and may be called an overall control section below.

A focus servo control device 8 controls a focus actuator (not shown) of an optical pickup 2 in response to instructions from the processor section 5, and fine tunes a vertical position of an object lens (21 of FIG. 2) of the optical pickup 2 relative to the optical disc 3 in reference to reproduction signals detected by the optical pickup 2. As a result, a laser light generated from a laser light source (not shown) of the optical pickup 2 is focused onto a recording layer of the optical disc 3 appropriately.

A laser power control section 7 controls the laser light source of the optical pickup 2 in response to instructions from the processor section 5 to generate a laser light of an optimum recording or reproducing power in accordance with a kind of the installed optical disc 3. The focus servo control and laser power control do not relate to the present invention directly and therefore their details are not explained.

After the above mentioned focus servo control and laser power control, a tracking servo control section 1 controls a tracking actuator (22 of FIG. 2) of the optical pickup 2 in response to instructions from the processor section 5. More specifically, the tracking servo control section 1 supplies a control current to a tracking actuator coil (221 of FIG. 2) of the optical pickup 2. Then, the tracking servo control section 1 fine tunes a radial position of an object lens (21 of FIG. 2) of the optical pickup 2 relative to the optical disc 3 in reference to a reproduction signal detected by the optical pickup 2. More specifically, a lens position detection section 4 detects, for example, a push-pull signal contained in the reproduction signal. As well known, a push-pull signal is generated because an intensity of a reflected light is different on a land portion from groove portion of a recording layer, and its average potential is an information signal showing a relative radial position of the optical pickup 2 and a recording track relative to the optical disc 3.

As described above, an average potential of the push-pull signal has an offset due to a circuit factor in the tracking actuator coil driving section (11 of FIG. 2) that drives the optical pickup 2. Therefore in this embodiment, the processor section 5 calculates the offset amount based on a reproduced push-pull signal, converts the amount into a voltage value added to an input of the tracking actuator coil driving section (11 of FIG. 2) of the tracking servo control section 1, and supplies the voltage value to an offset cancel section 6 to cancel the offset. As a result, a radial position of the optical pickup 2 is fine tuned to trace the center position of a recording track of the optical disc 3 appropriately.

As a way to acquire a voltage value added to the input of the tracking actuator coil driving section (11 of FIG. 2), an example using a push-pull signal detected in the lens position detection section 4 as described above is shown. This is one example. Any way to acquire a shift amount of a lens position of the object lens (21 of FIG. 2) due to the offset may be used. For example, after acquiring a lens shift amount by an optical technique, the shift amount may be converted into an electrical signal. Even when a push-pull signal is used as one example as mentioned above, a lens shift amount is acquired based on a push-pull signal essentially, and a voltage offset at the input of the tracking actuator coil driving section (11 of FIG. 2) is acquired from the lens shift amount. Therefore in this embodiment, the lens position detection section 4 is not limited to a push-pull signal detection section.

In addition to the above description, the optical pickup 2 obviously contains a focus actuator and focus actuator coil that fine tune a vertical position of the object lens 21 relative to the optical disc 3 as components used in a focus servo control performed by the focus servo control unit 8.

Next, a way to cancel the above mentioned offset due to circuit factors is explained in more detail.

Figure 2:
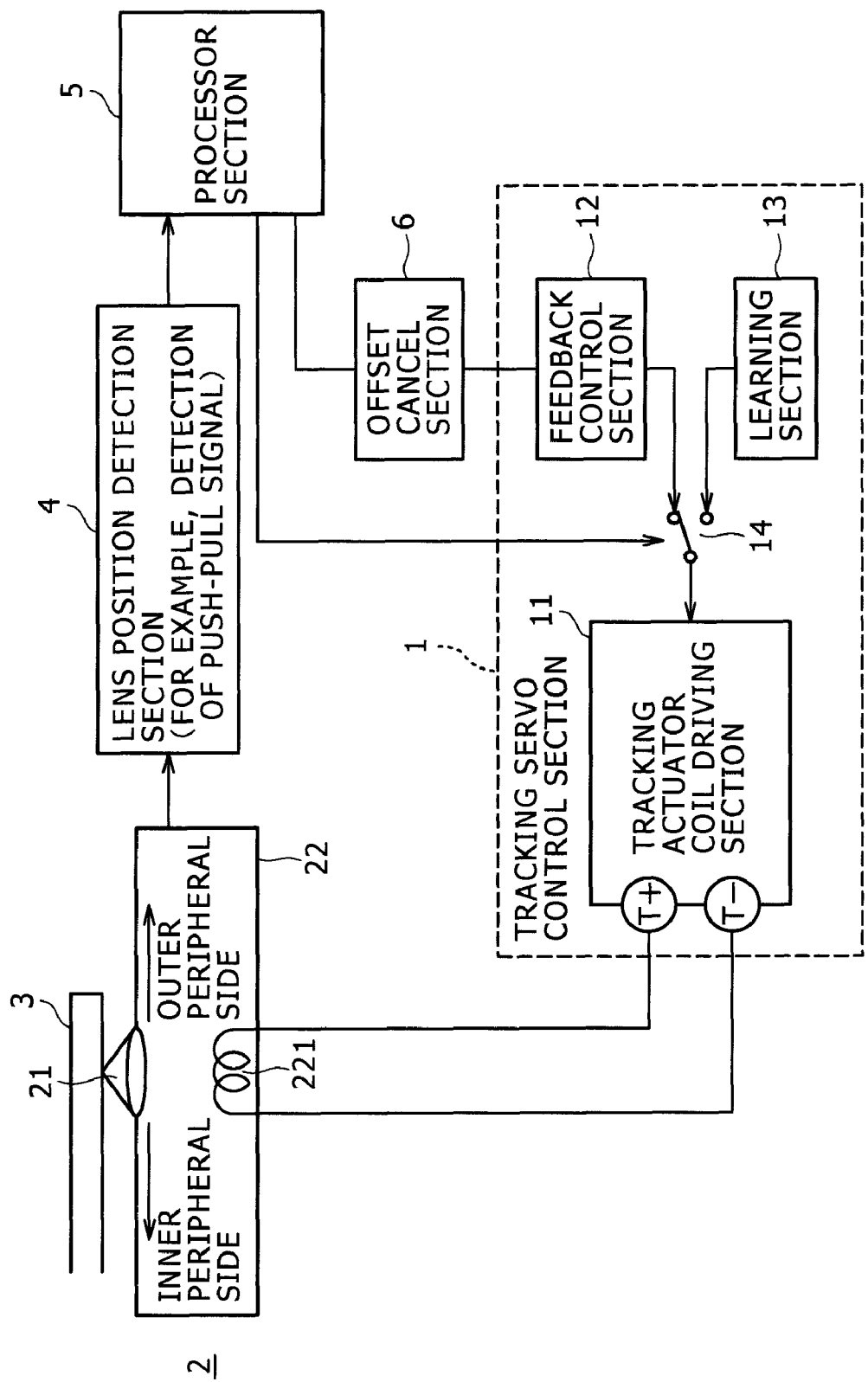
FIG. 2 is a block diagram of a tracking servo control system of the optical disc device in one embodiment of the present invention.

FIG. 2 is a block diagram of the tracking servo control system of the optical disc device in one embodiment of the present invention. The same reference numerals shown in FIG. 1 are given to the same components.

In this embodiment, one characteristic is that the tracking servo control section 1 has a learning section 13 in addition to the tracking actuator coil driving section 11 and a feedback control section 12. A switch 14 is switched in response to the operation mode, and a control signal from the feedback control section 12 or learning section 13 is supplied to the tracking actuator coil driving section 11. Accordingly, the tracking actuator coil driving section 11 supplies a control current to the actuator coil 221 of the tracking actuator 22, which is a component of the optical pickup 2, to move a radial position of the object lens 21 mounted to the tracking actuator 22.

In this embodiment, the tracking servo control section 1 has two operation modes. One is a feedback control mode in which the switch 14 supplies a control signal from the feedback control section 12 to the tracking actuator coil driving section 11. Another one is a learning mode in which the switch 14 supplies a control signal from the learning section 13 to the tracking actuator coil driving section 11. The operation modes are explained based on FIG. 3.

Figure 3:
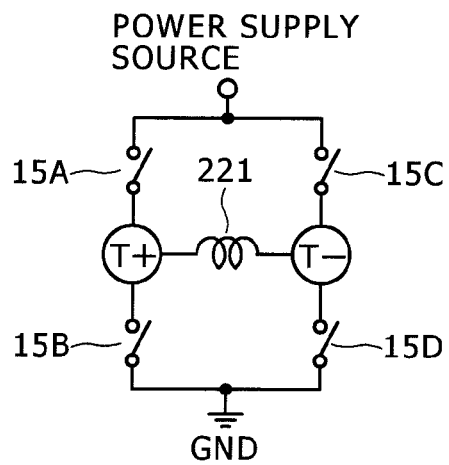
FIG. 3 is a circuit diagram showing a way of driving a tracking actuator coil in one embodiment of the present invention.

FIG. 3 is a circuit diagram showing a way to drive the tracking actuator coil in one embodiment of the present invention. Near current supply terminals (T+ and T− in the figure) for the actuator coil 221, switches 15A to 15D for connecting the terminals to a power supply source or ground are formed. Through the above mentioned operation modes, the switches 15A to 15D are switched as follows in response to control signals from the feedback control section 12 or learning section 13.

First, in the learning mode, the tracking actuator coil driving section 11 sets a driving current for the actuator coil 221 to zero. For that purpose, as a first way, all the switches 15A to 15D may be turned OFF to make an output impedance high. As a second way, the switches 15A and 15C may be turned OFF and the switches 15B and 15D may be turned ON to set the current supply terminals to a ground potential. As a third way, the switches 15A and 15C may be turned ON and the switches 15B and 15D may be turned OFF to set the current supply terminals to a power potential. As a forth way, the switches 15A and 15B may be turned OFF and the switches 15C and 15D may be, for example, switched complementarily, and the switches 15C and 15D may be turned OFF and the switches 15A and 15B may be, for example, switched complementarily. Zero current flowing through the actuator coil 221 is set in a circuit design as mentioned above, and an unavoidable leakage current may flow. Therefore, in the above mentioned state, a flowing current may be hereinafter described as a generally zero current.

That is, in the learning mode, a situation is created in which a current flowing through the actuator coil 221 is zero. In this state, the lens position detection section 4 detects an average potential of a push-pull signal, for example, reproduced in the optical pickup 2. As mentioned below, an average potential of a push-pull signal in the learning mode is one piece of information to acquire the above mentioned offset amount.

Conventionally, a tracking actuator coil driving section has no operation mode for setting an output current to generally zero, such as the above mentioned learning mode, for example, for making an output impedance high. As described above, as the demand for reduction of current consumption increases, DC sensitivity is increased. Therefore, the new operation mode is provided in this embodiment because the necessity of reducing a circuit offset may be further increased.

Next, the switch 14 of FIG. 2 is switched to supply a control signal from the feedback control section 12 to the tracking actuator coil driving section 11. Since the offset amount described above is still unknown, the offset cancel section 6 is not operating appropriately. The feedback control section 12 is so named because it performs a tracking servo control by a feedback control. However, it is noted that, in the operation of detecting and canceling the above offset, which is a characteristic of this embodiment, a feedback loop is open.

First, the tracking actuator coil driving section 11 drives the tracking actuator 22 by PWM (Pulse Width Modulation). That is, in FIG. 3, a first period in which the switches 15A and 15D are ON and the switches 15B and 15C are OFF and a second period in which polarities of the switches are reversed are provided, and the tracking actuator 22 is driven while changing a time ratio of the first period and the second period. By changing a time ratio of the first period and the second period, the object lens 21 moves in the radial direction of the optical disc 3 across the recording track.

As well known, a lens shift amount relating to a position of the object lens 21 and an average potential of, for example, a push-pull signal detected in the lens position detection section 4 are generally in proportion to one another.

The processor section 5 acquires relationship among a lens shift amount, an average potential of a push-pull signal detected in the lens position detection section 4, and a driving voltage supplied to the tracking actuator coil driving section 11. A difference between a tracking driving value (potential) for setting a current of the tracking actuator coil 221 to zero in design and an average potential acquired in the learning mode in the above is a voltage value corresponding to a circuit offset amount at a current output portion of the tracking actuator coil driving section 11. Based on this voltage value, the processor 5 acquires a voltage value for offset cancellation, and supplies the voltage value for offset cancellation to the offset cancel section 6. The offset cancel section 6 shifts the supplied voltage value from a detection signal in the lens position detection section 4. When the processor section 5 closes the feedback loop in that state, a tracking servo control can be performed in a state in which a lens shift due to a circuit offset is canceled, in other words, in a state in which a current supplied to the actuator coil 221 is zero when the object lens 21 traces the center of a recording track of the optical disc 3. Accordingly, the above described degradation of an error rate and off-tracking due to impacts can be reduced.

Figure 4:
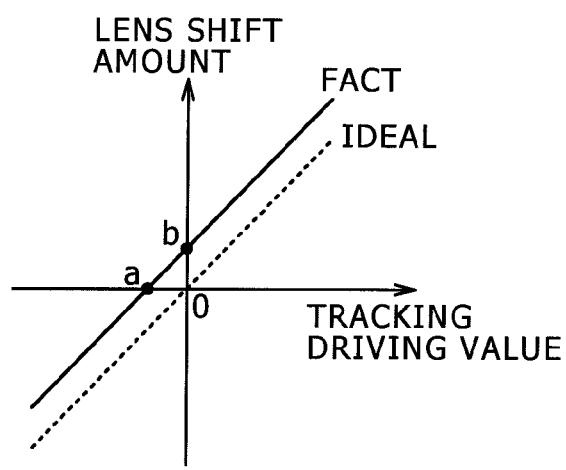
FIG. 4 shows relationship between a tracking driving value and a lens shift amount in one embodiment of the present invention.
Figure 5:
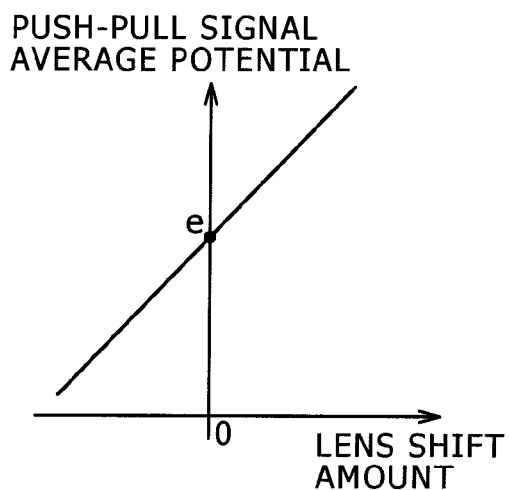
FIG. 5 shows relationship between a lens shift amount and a push-pull signal average amplitude value in one embodiment of the present invention.
Figure 6:
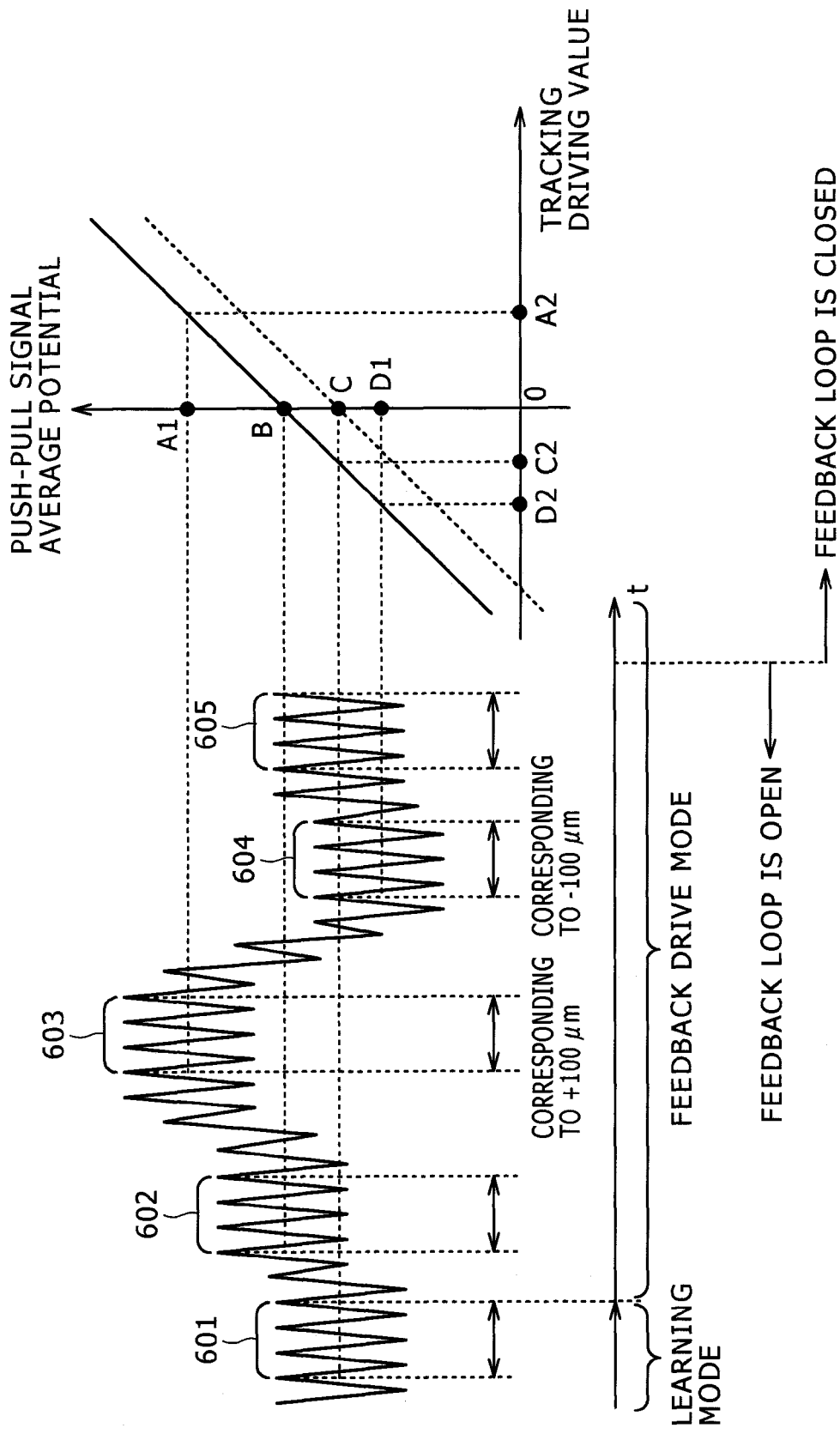
FIG. 6 shows relationship between a tracking driving value, a push-pull signal average amplitude value, and a push-pull signal waveform in one embodiment of the present invention.

The above operation is further explained based on FIGS. 4 to 6.

FIG. 4 shows relationship between a tracking driving value and a lens shift amount in one embodiment of the present invention. The dashed line of FIG. 4 shows an ideal case in which there is no offset. When a tracking driving value is zero, a lens shift amount is zero. This relationship is proportional. As shown by the solid line, even when a tracking driving value is zero, there is actually a lens shift amount shown by b in the figure. To set a lens shift amount to zero, namely, to set a lens shift amount to the same amount as in the learning mode, it is necessary to change a tracking driving value by a shown in the figure. This value a shows a voltage value shifted by the offset cancel section 6.

FIG. 5 shows relationship between a lens shift amount and a push-pull signal average potential in one embodiment of the present invention.

As well known, an average amplitude value of a push-pull signal detected in the lens position detection section 4 is proportional to a lens shift amount of the object lens 21. At a position for a lens shift amount of zero, the average amplitude value shows a determined value e. Therefore, as shown in FIGS. 4 and 5, a lens shift amount, a push-pull signal average potential, and a tracking driving value are in defined correlative relationship. That is, it is possible to acquire a lens shift amount from a push-pull signal average potential and further to acquire a voltage value shifted from a tracking driving value in the offset cancel section 6.

FIG. 6 shows relationship among a tracking driving value, a push-pull signal average potential, and a push-pull signal waveform in one embodiment of the present invention. Similarly to FIG. 4, in the relationship between a tracking driving value and a push-pull signal average potential shown in the right half of the figure, the solid line shows an actual case and the dashed line shows an ideal case.

The left half of the figure is one example of time variation of a push-pull signal waveform, in which a horizontal axis shows a time. The time axis is shown in accordance with the procedure of cancellation of the above mentioned offset.

First, the tracking servo control loop is opened. The tracking servo control section 1 is set to the learning mode. In the state in which a current of the actuator coil 221 is generally zero, the lens position detection section 4 detects a push-pull signal 601. The processor section 5 acquires the average potential C.

Next, the tracking servo control section 1 is set to the above mentioned feedback drive mode, but the feedback loop is still opened. The feedback control section 12 supplies a tracking driving value (potential) which sets a current of the actuator coil 221 to zero to the tracking actuator coil driving section 11 in its design. Since there is actually the above described offset, some current flows through the tracking actuator coil 221. Therefore, the object lens 21 is at a different radial position (hereinafter called an initial position) relative to the optical disc 3 from that in the learning mode. In this state, the lens position detection section 4 detects a push-pull signal 602. The processor section 5 acquires the average potential B.

Next, the feedback control section 12 supplies a tracking driving value A2 to the tracking actuator coil driving section 11 to move the object lenses 21 in one direction, e.g., by 100 μm from the initial position in its design. In this state, the lens position detection section 4 detects a push-pull signal 603. The processor section 5 acquires the average potential A1.

Next, the feedback control section 12 supplies a tracking driving value D2 to the tracking actuator coil driving section 11 to move the object lens 21, e.g., by 100 μm from the initial position in another direction in its design. In this state, the lens position detection section 4 detects a push-pull signal 604. The processor section 5 acquires the average potential D1.

The above operation allows the processor section 5 to acquire correlative relationship among three of a lens shift amount of the object lens 21, an average potential of a push-pull signal detected in the lens position detection section 4, and a tracking driving value (potential) at the input portion of the tracking actuator coil driving section 11.

Further, the processor section 5 acquires a difference of B and C, which are push-pull signal average potentials acquired in the above, to acquire a lens shift amount corresponding to this difference in reference to the above correlative relationship.

Next, the processor section 5 acquires a potential difference of a tracking driving value corresponding to the above mentioned lens shift amount at the input portion of the tracking actuator coil actuation 11 in reference to the above mentioned correlative relationship.

Further, the processor section 5 supplies an offset potential (C2 in the figure) corresponding to the potential difference to the offset cancel section 6 to cancel a circuit offset at the output portion of the tracking actuator coil driving section 11. Then, the average potential of the push-pull signal 605 detected in the lens position detection section 4 is acquired by the processor section 5 as C, which matches the value in the learning mode. Therefore, even when the tracking driving value supplied from the processor section 5 to the offset cancel section 6 is zero, the current flowing through the actuator coil 221 is also generally zero, achieving the ideal state equivalently shown by the dashed line of FIG. 4. That is, it is possible to cancel the circuit offset at the current output portion of the tracking actuator coil driving section 11. After that, it is possible to perform a predetermined tracking servo control by closing the above mentioned feedback loop. Accordingly, advantageously, the above described degradation of an error rate and off-tracking due to impacts can be reduced, a controllable range can be prevented from narrowing, and a tracking servo control can be performed by efficiently using a movable range permissible by a rated current of the actuator itself.

The example in which the object lens 21 moves from the initial position by an amount of 100 μm has been explained, but this may be one example and any moving amount may be used actually as long as the relationship among a lens shift amount, an average potential of a push-pull signal, and a tracking driving value can be acquired. It is not necessary to move to both radial direction. For example, it may be also allowable to move by 50 or 100 μm only in one direction. Additionally, it may be also allowable to move by 100 μm in one direction and by 50 μm in another direction.

Next, the operation flow of this embodiment is explained based on FIG. 7.

FIG. 7 is a flowchart of offset cancellation in one embodiment of the present invention. First, in Step S701, the processor section 5 instructs the focus servo control unit 8 to perform a focus servo control in which a vertical position of the object lens 21 relative to the optical disc 3 is fine tuned to focus a laser light generated from a laser light source of the optical pickup 2 onto the optical disc 3. In Step S701, a tracking servo control is not yet performed.

In Step S702, the processor section 5 instructs the tracking servo control section 1 to enter the learning mode. That is, the switch 14 is connected to the opposite side to the side shown in FIG. 2 to connect the learning section 13 and tracking actuator coil driving section 11. Accordingly, the output portion of the tracking actuator coil driving section 11 is set, e.g., to have a high output impedance so that a current flowing through the actuator coil 221 is zero, as explained above using FIG. 3. Steps S702 and S703 may be reversed in order.

In Step S703, in the learning mode, the processor section 5 acquires an average potential of the push-pull signal 601 detected in the lens position detection section 4. This average potential corresponds to the value C of FIG. 6.

In Step S704, the processor section 5 instructs the tracking servo control section 1 to enter the feedback mode. That is, the switch 14 is connected to the side shown in FIG. 2 to connect the feedback control section 12 and the tracking actuator coil driving section 11. Since, in this step, the setting of the offset cancel section 6 has not been performed yet, the processor section 5 keeps the feedback loop open.

In Step S705, the feedback control section 12 supplies a tracking driving value (potential) which sets a current of the tracking actuator coil 221 to zero to the tracking actuator coil driving section 11 in its design. Since there is actually the above described offset, some current flows through the tracking actuator coil 221. In this state, the processor section 5 acquires an average potential of the push-pull signal 602 detected in the lens position detection section 4. This average potential corresponds to the value B of FIG. 6.

In Step S706, the feedback control section 12 supplies a tracking driving value which shifts the object lenses 21 by about 100 μm in one radial direction of the optical disc 3 to the tracking actuator coil driving section 11 in its design. In this state, the processor section 5 acquires an average potential of the push-pull signal 603 detected in the lens position detection section 4. This average potential corresponds to the value A1 of FIG. 6. The feedback control section 12 supplies a tracking driving value which shifts the object lenses 21 by about 100 μm in another radial direction of the optical disc 3 to the tracking actuator coil driving section 11 in its design. In this state, the processor section 5 acquires an average potential of the push-pull signal 604 detected in the lens position detection section 4. This average potential corresponds to the value D1 of FIG. 6. As a result, the processor 5 can acquire correlative relationship among three of a lens shift amount of the object lens 21, an average potential of a push-pull signal detected in the lens position detection section 4, and a tracking driving value (potential) at the input portion of the tracking actuator coil driving section 11.

In Step S707, the processor section 5 acquires how much lens shift amount a difference between the average potential C detected in Step S703 and the average potential B detected in Step S705 corresponds to in reference to the result in Step S706.

In Step S708, the processor section 5 acquires how much potential difference a lens shift amount acquired in Step S707 corresponds to as a tracking driving value at the input portion of the tracking actuator coil driving section 11 in reference to the result in Step S706.

In Step S709, the processor section 5 instructs the offset cancel section 6 to shift a tracking driving value at the input portion of the tracking actuator coil driving section 11 correspondingly to a potential difference acquired in Step S708 for offset cancellation. Through the above operation, the offset due to electric factors can be cancelled.

Finally, in Step S710, after closing the feedback loop, the processor section 5 instructs the tracking servo control section 1 to perform a predetermined tracking servo control. Accordingly, a tracking servo control is performed while the above mentioned circuit offset of the output portion of the tracking actuator coil driving section 11 has been canceled. This advantageously permits above described degradation of an error rate and the off-tracking due to impacts to be reduced.

This specification describes the acquisition of an offset of a lens shift amount by use of average potentials of push-pull signals, but the acquisition is not limited to this example. For example, this optical disc device may be constituted to use an intermediate value of the maximum and minimum potentials of a push-pull signal instead of the average potential.

While we have shown and described several embodiments in accordance with our invention and it should be understood that disclosed embodiments are susceptible of changes and modifications without departing from the scope of the invention. Therefore and we do not intend to be bound by the details shown and described herein but intend to cover all such changes and modifications that fall within the ambit of the appended claims.

What is claimed is:

1. An optical disc device using an optical disc as a recording medium to record and reproduce an information signal by irradiating a laser light onto the recording medium,
the device comprising:
an optical pickup including a laser light source generating the laser light, an object lens which collects the laser light generated by the laser light source and through which the laser light is irradiated onto the optical disc, and a tracking actuator for tuning a relative radial position of the object lens relative to the optical disc, the optical pickup recording an information signal onto a recording track of the optical disc or reproducing an information signal recorded on the optical disc;
a tracking servo control section for controlling a relative radial position of the object lens relative to the optical disc by driving the tracking actuator based on position information about a relative radial position of the object lens relative to the optical disc; and
an overall control section for controlling operations of the optical disc device,
the tracking servo control section including a first operation mode for setting a driving power supplied to the tracking actuator to generally zero, a second operation mode for supplying a predetermined driving power to the tracking actuator in response to a predetermined input potential supplied to the tracking servo control section based on a control from the overall control section, and a third operation mode for supplying a driving power to the tracking actuator based on information about a relative radial position of the object lens relative to the optical disc, the information being supplied from the overall control section to the tracking servo control section,
the overall control section, when the optical disc is installed to the optical disc device,
setting the tracking servo control section to the first operation mode to acquire information about a relative radial position of the object lens relative to the optical disc,
setting the tracking servo control section to the second operation mode in which a driving power changing an input potential supplied to the tracking servo control section by a predetermined amount by which the object lens moves in both radial directions of the optical disc is set to be supplied to the tracking actuator to acquire relationship between the input potential and information about a relative radial direction of the object lens relative to the optical disc, and
shifting the input potential supplied to the tracking servo control section based on the information about the relative radial position in the first operation mode and the relationship in the second mode to set the tracking servo control section to the third operation mode in which a tracking servo control for the optical disc device is performed.

2. The optical disc device according to claim 1 wherein the tracking servo control section includes an offset cancel section for shifting an input potential based on information about a relative radial position of the object lens relative to the optical disc when the tracking servo control section operates in the third operation mode.

3. The optical disc device according to claim 1 wherein the information about a relative radial position of the object lens relative to the optical disc in the tracking servo control section is acquired based on a reproduction signal supplied from the optical disc by the optical pickup.

* * * * *